United States Patent [19]
Habiger et al.

[11] 3,727,628
[45] Apr. 17, 1973

[54] UNDERSPEED VALVE HYDROSTATIC CONTROL SYSTEM

[75] Inventors: Cyril W. Habiger; Donald L. Hopkins, both of Joliet; Gordon W. Johnson, Peoria; William B. Norick, Joliet; Rollin P. Van Zandt, Peoria; Frank H. Winters, Kellar Heights, all of Ill.

[73] Assignee: Caterpillar Tractor Co., Peoria, Ill.

[22] Filed: Aug. 31, 1970

[21] Appl. No.: 68,317

[52] U.S. Cl..............137/101, 137/117, 60/52 HE, 91/426, 91/458
[51] Int. Cl..............................................G05d 11/00
[58] Field of Search..................137/100, 101, 115, 137/117, 625.62; 91/426, 458; 60/19, 52 HE

[56] References Cited

UNITED STATES PATENTS

| | | | |
|---|---|---|---|
| 3,009,447 | 11/1961 | Lloyd | 137/625.62 X |
| 3,174,500 | 3/1965 | Johnson et al. | 137/115 |
| 2,720,282 | 10/1955 | Teague et al. | 137/117 X |
| 2,462,983 | 3/1949 | MacDuff et al. | 137/101 X |
| 2,931,389 | 4/1960 | Moog et al. | 137/625.62 |
| 2,952,267 | 9/1960 | Reis | 137/115 |

FOREIGN PATENTS OR APPLICATIONS 914,495  1/1963  Great Britain..................137/101

Primary Examiner—Martin P. Schwadron
Assistant Examiner—David J. Zobkiw
Attorney—Fryer, Tjensvold, Feix, Phillips & Lempio

[57] ABSTRACT

A hydrostatic control system including an underspeed valve which may be used to control the displacement of hydraulic pumps and motors by differential pressure generating means. The underspeed valve has a valve spool which is actuated by a pressure proportional to engine speed, a pressure responsive to a demand speed, and a preset spring biasing pressure.

6 Claims, 4 Drawing Figures

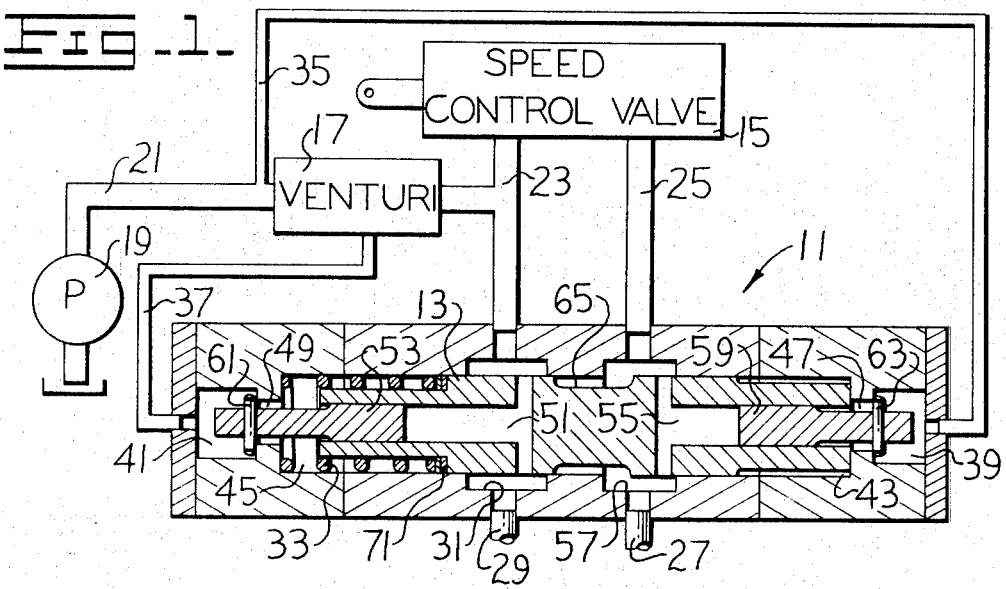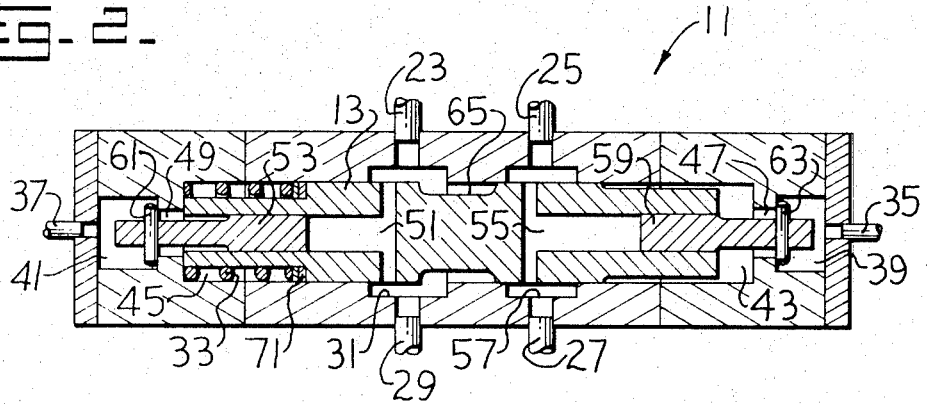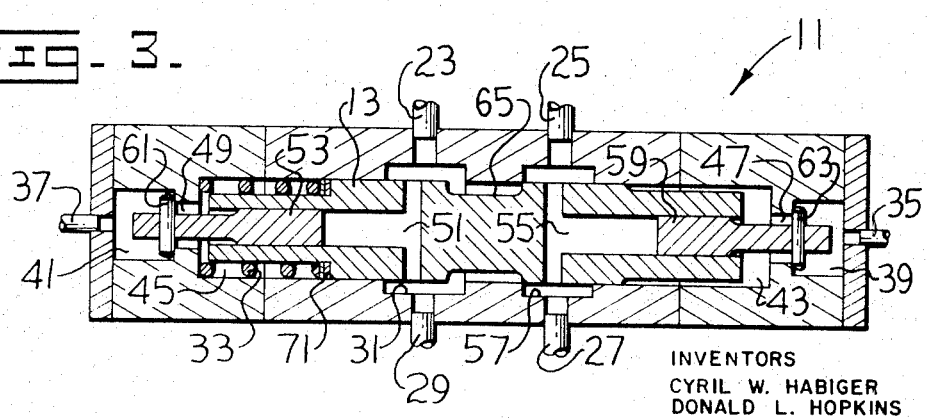

UNDERSPEED VALVE HYDROSTATIC CONTROL SYSTEM

BACKGROUND AND SUMMARY OF THE INVENTION

Many presently known hydrostatic control systems perform quite well with the underspeed valves which have been provided up until this time. However, it has been found that most of these valves are neither as responsive nor as accurate as desirable for optimum vehicle operation. This lack of response and accuracy occasionally causes the system to be unstable, resulting in a loss of available engine horsepower to the hydrostatic transmission.

The present invention relates to a hydrostatic control system including an underspeed valve which may be used in controlling the displacement of hydraulic pumps and motors by differential pressure means to control the speed of a hydrostatic machine in a manner similar to that described in U.S. Pat. No. 3,477,225 to Cryder et al. and assigned to the assignee hereof. Of course, the valve and circuitry of this invention could be utilized in any hydraulic circuitry requiring the type of control which the valve provides.

In general, the underspeed valve herein disclosed senses and balances three separate forces to regulate the valve spool for hydrostatic control system application. More particularly, the valve senses engine speed, demanded speed, and a preset control force to accomplish the desired result.

The hydraulic valve of this invention has a spool which is reciprocally located therein, the spool being responsive to the spring force and two or more differential pressure forces. The spool is positioned according to a balance of the forces which act simultaneously on the spool to cause the valve to automatically regulate the flow through a hydraulic circuit. Further, the valve permits regulation and control of the output speed of a hydrostatic transmission in a synchronous relationship to the vehicle engine speed, regardless of the setting of a manually operated speed control valve which is connected in parallel with the hydraulic valve in the control circuit.

When the engine speed is below a predetermined level, the spool is shifted in one direction to hydraulically lock the underspeed valve out of the control circuit, permitting complete control of the transmission output speed by means of the speed control valve. This produces maneuverability at low engine speed.

Therefore, it is an object of this invention to provide an improved hydrostatic control system and underspeed valve.

It is also an object of this invention to provide a new design for a hydrostatic control system and pressure modulated underspeed valve which affords improved response and regulation, while allowing less error and less phase lag in correcting the transmission output speed in response to a change in engine speed.

It is also an object hereof to produce such a control system and valve which is fairly simple in design and inexpensive to manufacture.

It is a further object hereof to provide such a control system and valve which incorporates a device to hydraulically lock the underspeed valve out of the control circuit when the engine is running below a certain speed, so that machine speed will not be affected by the underspeed valve and can be controlled solely by a speed control valve.

It is also an object hereof to provide a control system and underspeed valve which allows the operator to control the flow through a hydraulic circuit at low idle engine speeds without interference from the underspeed valve.

Other objects and advantages of the present invention will become apparent from the following description and claims as illustrated in the accompanying drawing which, by way of illustration, shows preferred embodiments of the present invention and principles thereof and what is now considered to be the best modes contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWING

FIG. 1 is a sectional schematic view of a first embodiment of the underspeed valve of the present invention, showing part of the hydraulic circuitry utilized with this valve;

FIGS. 2 and 3 are sectional illustrations of this valve, showing the valve spool in various control positions.

DETAILED DESCRIPTION OF THE INVENTION

Figure 4:
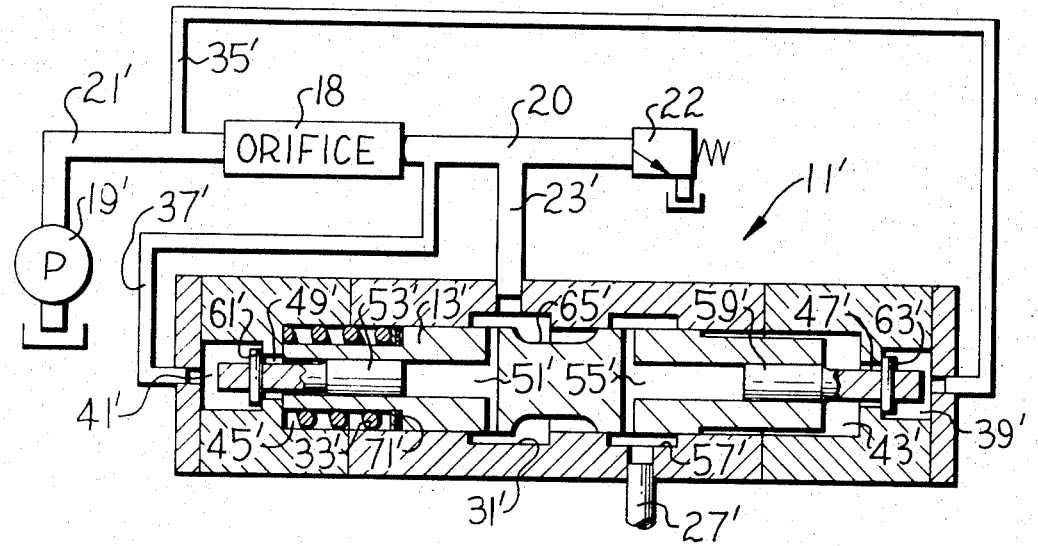
FIG. 4 is a sectional schematic view of a second embodiment of the underspeed valve of the present invention, showing part of the hydraulic circuitry utilized with this valve.

An underspeed valve 11 is shown in FIG. 1 having a spool 13 illustrated in the position assumed when the engine is not running, or is running below a predetermined cut-off speed, e.g., 1,000 r.p.m.

A speed control valve 15, a modified venturi 17, and a supply pump 19 which supplies the fluid necessary for the hydrostatic control system, are also illustrated.

The components which are controlled by the speed control valve 15 and the underspeed valve 11 have not been illustrated, but these may include speed modulation valves, a motor pilot actuator, etc., in the manner set forth in the previously described U.S. Pat. No. 3,477,225.

Flow from the pump 19 passes through the venturi 17 via a line 21 and into line 23. When speed control valve 15, as shown in FIG. 1, is in the neutral position, flow from the line 21 will pass freely through the valve 15 and into a line 25, through the valve 11, and into a line 27, through which it will return to tank after going through the relief and replenishing circuits (not shown), as disclosed in the above patent.

The line 23 connects with a line 29 via an annulus 31, which directs fluid to a speed modulation and direction control valve within the hydrostatic control circuit.

When the speed control valve 15 is moved from a neutral position, a differential pressure is built up between lines 23 and 25, and consequently between lines 29 and 27, with the higher pressure being felt in lines 23 and 29. In the illustrated usage of the valve, the differential pressure controls the transmission speed by controlling the displacement of the hydrostatic pump and motors by means of actuators. The effect of the pressure differential on the position of valve spool 13 will be explained later, but constitutes one of the forces acting upon the spool.

The second force acting upon spool 13 is differential pressure which is proportional to engine speed. The pressure is developed across the venturi 17 and is determined by the amount of flow from the fixed displacement, engine driven pump 19 which passes through the venturi.

The third force acting upon the spool 13 is that of a biasing spring 33 which will always tend to move spool 13 towards the right, as shown in the drawings.

Referring once again to FIG. 1, spool 13 is shown in the closed position that it will assume when the engine is not running, or when it is running below a predetermined speed. In this condition, the pump 19 is not delivering much fluid, if any, to the control system. The dominant forces working on spool 13 are developed by the spring 33 and the venturi differential pressure, which is relatively low. Also, some pressure differential between lines 23 and 25 may exist and act upon the spool. The sum of these forces acting on the spool holds it in the position shown.

As the engine is speeded up to rated speed and the pump supplies fluid to the system at a rate proportional to engine speed, since it is a fixed displacement engine driven pump, the spool will move to a second, closed position as shown in FIG. 2, so long as the speed control valve is kept in the neutral position and no speed differential pressure is developed between lines 23 and 25. In this condition, the differential pressure across the venturi 17 will increase so that the inlet pressure in line 21, which is also transmitted to a line 35, will be much higher than a throat pressure from the venturi, which is communicated to the left end of the valve by a line 37.

The line 35 connects with a chamber 39 and the force from the venturi inlet pressure transmitted to that chamber will work against the end of the spool and move it to the left, against the force generated by spring 33, together with a throat pressure from the venturi which is transmitted to chamber 41 via line 37.

The fluid in chambers 39 and 41 is transmitted to chambers 43 and 45, respectively, via apertures 47 and 49 as shown.

After the engine has been started and the machine is moving ahead at a speed determined by the position of the speed control valve, causing a pressure differential to be developed between lines 23 and 25, the spool assumes a position such as that shown in FIG. 3. This position is determined by a balance of the forces which are acting upon the spool, the first force being the speed control differential pressure, the second being the venturi differential pressure which senses engine speed, and the third force being the predetermined spring biasing pressure.

The speed control differential pressure acts upon the spool 13 as follows: Line 23 is communicated to a chamber 51 in the left end of the spool via annulus 31. The force from the pressure in chamber 51 acts against a piston 53 so that the opposing force tends to move the spool to the right.

Pressure in line 25 is communicated to a chamber 55 in the other end of the spool, via an annulus 57, and force from that pressure reacts against a piston 59 located in the right end of the spool, tending to move the spool 13 to the left. As shown in FIG. 3, the force in chamber 55 at least partially offsets the sum of the forces generated in chamber 51 and spring 33 to maintain the spool in a balanced position.

The pistons 53 and 59 are restrained from moving inwardly under the influence of the venturi differential pressure by means of pins 61 and 63 which are pressed through apertures in the extensions of the pistons.

When a machine utilizing the subject control system and underspeed valve encounters a condition wherein the engine is lugged or slowed down, the condition causes a decrease in the speed of the pump 19 which, in turn, will decrease the flow through the venturi. As the flow decreases, the venturi throat pressure in line 37 will increase such that pressure in chambers 41 and 45 will increase, resulting in an increased force tending to move the spool to the right. The shift to the right will cause more flow to be bypassed from line 23 to line 25 via an annulus 65 in the spool. In effect, this decreases the differential pressure across the speed control valve 15 until the sum of all the forces are again balanced. The decreased speed differential pressure will change the displacement of the hydrostatic pumps or motors such that the transmission output speed will be decreased until the engine power available is sufficient to provide the output torque demanded of the transmission.

When the torque load decreases, the engine speed will increase with a resultant increase in pump output flow. As the flow through the venturi increases, decreasing the pressure in line 37, the pressure in chambers 41 and 45 will be decreased and the spool 13 will be shifted back to the left. This will cause a speed differential pressure to be returned to the level indicated by the speed control valve and will shift the hydrostatic pumps or motors back to the displacement positions they were in before the lug condition was encountered.

When the engine speed is slowed below the predetermined low speed, the throat pressure in the venturi, and thus in the valve, will be great enough, when added to spring force, to overcome the force in chambers 39 and 43, added to whatever forces may be acting on the spool due to the speed differential pressure, and move the spool to the right to the position shown in FIG. 1. This hydraulically locks the valve out of the control circuit and permits control of the machine solely by the speed control valve 15.

Adjustment of the predetermined spring force in the valve may be accomplished by placing shims 71 between the spring and the spool, thereby providing the correct balance of forces to position the valve spool for production of the proper underspeed cut-in point.

FIG. 4 shows valve 11' which is a second embodiment of the valve of this invention which bears structural similarity to first embodiment valve 11. Primes are used throughout the following discussion to denote structure having correspondnece with that shown in the first embodiment.

The basic structural changes involved are the elimination of speed control valve 15 and the replacement of venturi 17 with orifice 18 in the hydrostatic control system. This elimination of the speed control valve operates to reduce the number of forces acting on the spool from three to two.

The first force acting on spool 13' is a differential pressure which is proportional to engine speed. This differential pressure is developed by means of the pressure drop across orifice 18.

The second force acting on spool 13' is that of biasing spring 33' which operates in the manner disclosed with the first embodiment.

The operation of valve 11' is similar to that of valve 11. The subject valve assumes the position shown in FIG. 4 when the engine is running at rated speed. When the engine is running at rated speed, pump 19' will deliver fluid through line 21', orifice 18, and line 20 to pressure relief valve 22. Relief valve 22 functions to protect line 20 from overpressurization and maintains a nearly constant pressure level downstream of orifice 18. Line 20 may be additionally connected to power a hydraulic circuit such as a brake circuit (not shown).

Due to the pressure drop across orifice 18, the pressure on the upstream side of the orifice will be greater than that on the downstream side. Consequently, pressure in chamber 39' communicated by line 35' will be greater than that in chamber 41' communicated by line 37'.

Pressure thus communicated to chamber 39' will act to shift the spool to the left against the biasing force of spring 33'. In addition, pressure in line 23' which is communicated to chamber 55' by means of annuli 31' and 57' will react with piston 59' to also force the spool to the left, which will then cause the spool to close off communication between these annuli. In this position, shown in FIG. 4, there is no communication between lines 23' and 27'. Thus, no fluid will be directed to the pump and/or motor actuators.

When an overload condition is encountered in the machine utilizing the subject control system, the engine speed and consequently pump speed decreases, producing a lowering of the pressure differential across the orifice. The consequent lowering of pressure in chamber 39' will allow spring 33' to shift the spool to the right to open communication between annuli 31' and 57'. Fluid from lines 23' thus flows across the annuli and into line 27' where it is directed to the hydrostatic control circuit, e.g., to activate servo valves (not shown) to reposition variable displacement pumps (not shown) to a lower displacement value consistent with the reduced engine speed.

Once the overload condition has been relieved, the pump flow will increase and produce a higher pressure differential across the orifice, thereby causing a repositioning of the valve spool and consequent cutting off of flow to the hydrostatic control circuit.

Thus, the applicants have provided a new and improved hydrostatic control system and underspeed valve which produces increased responsiveness and accuracy, thereby diminishing waste and loss of the engine horsepower available to hydrostatic transmissions. Of course, the valve may also be utilized in many other applications, and modifications and alterations of the valve, which will be obvious to those skilled in the art, may be made without exceeding the purview of the following claims.

What is claimed is:

1. A valve comprising a body, a spool located within a bore in the body, means biasing said spool to a first position against one end of the body, at least one fluid inlet in said body communicating the exterior of said body with said spool, at least one fluid outlet communicating the exterior of said body with said spool at a point on said spool removed from the point of communication of said at least one fluid inlet, a first chamber located entirely within the other end of said spool, means communicating said first chamber with said at least one fluid inlet, a first piston reaction means in said first chamber for causing said spool to be motivated toward the one end of said body, a second chamber located entirely within the one end of said spool for selective communication with said at least one fluid inlet, a second piston reaction means in said second chamber for causing said spool to be motivated toward the other end of said body, means on said spool closing off communication between said at least one fluid inlet and said at least one fluid outlet when said spool is in said first position as well as in a second position against said other end of said body, said means on said spool intercommunicating said at least one fluid inlet with said at least one fluid outlet when said spool is in a position intermediate said first and second positions, a second fluid inlet in said one end of said body and in communication with said one end of said valve spool to motivate said valve spool toward said other end of said body, and a third fluid inlet in said other end of said body and in communication with said other end of said valve spool to motivate said valve spool toward said one end of said body.

2. The invention of claim 1 further including means for generating a first fluid pressure, means for generating a pressure differential from said first fluid pressure so as to produce a second fluid pressure, means communicating said first fluid pressure with said second fluid inlet, and means communicating said second fluid pressure with said at least one fluid inlet and said third fluid inlet.

3. The invention of claim 2 wherein said pressure differential generating means comprises an orifice.

4. The invention of claim 1 further including means generating a first fluid pressure, means for generating a pressure differential from said first fluid pressure so as to produce second and third fluid pressures, means communicating said first fluid pressure with said second fluid inlet, means communicating said second fluid pressure with said at least one fluid inlet, and means communicating said third fluid pressure with said third fluid inlet.

5. The invention of claim 4 wherein said at least one fluid inlet comprises fourth and fifth fluid inlets positioned so as to motivate said spool in opposite directions, means communicating said second fluid pressure with said fourth fluid inlet, and speed control valve means for variably intercommunicating said fourth and fifth inlets so as to provide a variable pressure differential between said fourth and fifth inlets.

6. The invention of claim 4 wherein said means generating a pressure differential comprises a venturi.

* * * * *